(12) United States Patent
Garcia

(10) Patent No.: US 9,467,082 B2
(45) Date of Patent: Oct. 11, 2016

(54) METHOD FOR DAMPING DRIVE TRAIN OSCILLATIONS IN A WIND TURBINE GENERATOR

(71) Applicant: VESTAS WIND SYSTEMS A/S, Aarhus N (DK)

(72) Inventor: Jorge Martinez Garcia, Aarhus N (DK)

(73) Assignee: Vestas Wind Systems A/S, Aarhus N. (DK)

( * ) Notice: Subject to any disclaimer, the term of this patent is extended or adjusted under 35 U.S.C. 154(b) by 0 days.

(21) Appl. No.: 14/372,266

(22) PCT Filed: Jan. 25, 2013

(86) PCT No.: PCT/DK2013/050021
§ 371 (c)(1),
(2) Date: Jul. 15, 2014

(87) PCT Pub. No.: WO2013/110279
PCT Pub. Date: Aug. 1, 2013

(65) Prior Publication Data
US 2015/0008672 A1    Jan. 8, 2015

Related U.S. Application Data

(60) Provisional application No. 61/651,016, filed on May 24, 2012.

(30) Foreign Application Priority Data

Jan. 27, 2012  (DK) ................................ 2012 70046

(51) Int. Cl.
*F03D 9/00*   (2016.01)
*H02P 9/10*   (2006.01)
(Continued)

(52) U.S. Cl.
CPC ................ *H02P 9/105* (2013.01); *H02J 3/24* (2013.01); *H02J 3/38* (2013.01); *H02J 3/386* (2013.01); *Y02E 10/763* (2013.01); *Y10T 307/718* (2015.04)

(58) Field of Classification Search
CPC ............. F03D 5/02; H02J 3/24; H02J 3/386; H02P 9/105; Y10T 307/718
USPC ........................................ 290/44, 55; 307/84
See application file for complete search history.

(56) References Cited

U.S. PATENT DOCUMENTS 3,228,252 A * 1/1966 Trimble .......................... 73/462
4,377,780 A * 3/1983 Bjorklund ........................ 322/29
(Continued)

FOREIGN PATENT DOCUMENTS

EP   1780860 A1   5/2007
EP   1819023 A2   8/2007
(Continued)

OTHER PUBLICATIONS

International Search Report for PCT/DK2013/050021, Jul. 24, 2013.
(Continued)

*Primary Examiner* — Julio Gonzalez Ramirez
(74) *Attorney, Agent, or Firm* — Patterson + Sheridan, LLP

(57) ABSTRACT

The present invention relates a wind turbine generator with an electrical generator, a dump load unit, for dissipating power, a wind turbine power controller and a damping controller both arranged to control wind turbine components based on a damping reference signal, the damping reference signal is a combined signal, and comprises a first reference signal and a second reference signal, the second reference signal is an oscillating part, the wind turbine power controller is controlling the power from the electrical generator according to the first reference signal and the damping controller is controlling the dump load unit to dissipate power according to the second reference signal. The invention also relates to a method for damping oscillations with wind turbine generators.

19 Claims, 11 Drawing Sheets

(51) Int. Cl.
*H02J 3/24* (2006.01)
*H02J 3/38* (2006.01)

(56) References Cited

U.S. PATENT DOCUMENTS

| | | | |
|---|---|---|---|
| 4,695,736 A * | 9/1987 | Doman et al. | 290/44 |
| 5,227,713 A * | 7/1993 | Bowler et al. | 322/58 |
| 5,759,133 A * | 6/1998 | Treinies et al. | 477/110 |
| 2007/0100506 A1* | 5/2007 | Teichmann | 700/297 |
| 2007/0279012 A1* | 12/2007 | Sihler | 322/20 |
| 2009/0001940 A1 | 1/2009 | Sihler et al. | |
| 2011/0074151 A1* | 3/2011 | Burra | F03D 9/02 290/44 |
| 2011/0101689 A1 | 5/2011 | Larsen et al. | |
| 2011/0222320 A1 | 9/2011 | Delmerico et al. | |
| 2013/0127492 A1* | 5/2013 | Kammerer et al. | 326/30 |
| 2014/0232198 A1* | 8/2014 | Garcia et al. | 307/84 |

FOREIGN PATENT DOCUMENTS

| | | |
|---|---|---|
| EP | 2306001 A2 | 4/2011 |
| WO | 2012/003970 A1 | 1/2012 |

OTHER PUBLICATIONS

Danish Search Report for PA 2012 70046, Sep. 11, 2012.

* cited by examiner

METHOD FOR DAMPING DRIVE TRAIN OSCILLATIONS IN A WIND TURBINE GENERATOR

FIELD OF THE INVENTION

The present invention relates generally to control of power systems and more specifically to damping sub-synchronous resonance oscillations by employing control means in wind turbine generators.

BACKGROUND OF THE INVENTION

Sub-synchronous resonances (SSR) is a well-known phenomenon for conventional power plants, but it is a relatively newly discovered phenomenon for wind power plants. This type of interaction phenomenon is generally referred to as a sub-synchronous control interaction (SSCI). This is a purely electrical phenomenon without shaft torsional dynamics being involved. Another characteristic of SSCI is that the resonance frequency varies depending on the network impedances. Other oscillating modes may include shaft torsional dynamics and can also be dealt with in the present invention.

The conventional sub-synchronous torsional interaction (SSTI) can occur in wind power plants. Wind turbines generally include several sub-synchronous torsional modes. It would be likely to excite one of these low-frequency torsional modes if the frequency of grid current coincides with one of them.

Wind power plants generally make extensive use of power electronic controllers such as turbine converters, and sometimes SVC and STATCOM for reactive power compensation and voltage control, and HVDC links for connection of offshore wind farms. These components can be located in the vicinity of rotating equipment such as those of the wind turbine and thermal power plants, or adjacent to variable frequency drive generators.

When created, these Sub-synchronous resonances (SSR) oscillations may cause damage to turbine-generator shafts and components attached to the shaft. The causes and consequences of sub-synchronous resonance are exacerbated by the continued growth of power transmission system interconnections.

It is known that frequency and voltage of the electric power transmitted in the grid may start oscillating due to disturbances or bad control coordination between different generation units. It is also known that such oscillations in the grid may be counteracted or damped by injecting electric power with the right phase relative to the grid oscillations. However, injection of such electric power may excite mechanical resonances in the power generator device which produces the damping electric power.

Accordingly, it is a problem that when a power generator is controlled to damp grid oscillations vibrations in the power generator may inadvertently be excited.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In an aspect, the present invention relates to a wind turbine generator with an electrical generator, a dump load unit, for dissipating power, a wind turbine power controller and a damping controller both arranged to control wind turbine components based on a damping reference signal, the damping reference signal is a combined signal, and comprises a first reference signal and a second reference signal, wherein the second reference signal is an oscillating part,
said wind turbine power controller is arranged to control the power from the electrical generator according to the first reference signal and
said damping controller is arranged to control the dump load unit to dissipate power according to the second reference signal.

An advantage of first aspect is that the mechanical production variation of the wind turbine generator can be none oscillating, whereas the power supplied to the grid has an oscillating shape, provided by the second reference signal and the dump load unit, in order helps and support the reduction of the grid resonances.

According to one embodiment of the invention the first reference signal is an envelope curve of the damping reference signal.

An advantage of this embodiment is that the first reference signal can provide an envelope around the curve needed to reduce an oscillation in the grid.

According to one embodiment of the invention the first reference signal is a monotonic function.

An advantage of this embodiment is that monotonic functions tend to move in only one direction as x increases. A monotonic increasing function always increases as x increases, i.e. $f(a)>f(b)$ for all $a>b$. A monotonic decreasing function always decreases as x increases, i.e. $f(a)<f(b)$ for all $a>b$. A monotonic decreasing function's derivative is always negative. A monotonic increasing function's derivative is always positive. Thus the mechanical stress on the wind turbine generator structure is reduced.

According to one embodiment of the invention the first reference signal is increasing and starting from a negative value.

An advantage of this embodiment is that the first reference signal can be seen as a temporary derating of the power from the wind turbine generator.

According to one embodiment of the invention the wind turbine power controller, whenever receiving a negative first reference signal, sends a reference equal zero to the electrical generator.

An advantage of this embodiment is that the first reference signal can be negative, but the wind turbine generator can by means of the dump load still provide full oscillation damping without derating.

According to one embodiment of the invention the first reference signal is decreasing and starting from a positive value, and wherein the wind turbine power controller further is arranged for receiving a positive power reference.

An advantage of this embodiment is that the first reference signal can be seen as a temporary increasing of the power from the wind turbine generator, and thus it utilizes overload capabilities in the wind turbine generator.

According to one embodiment of the invention the first reference signal is substantially zero and wherein the dump load unit dissipates the negative sections of the second reference signal.

An advantage of this embodiment is that even if the first reference signal is substantially zero the dump load can still provide some contribution to the reduction of the oscillation.

According to one embodiment of the invention the wind turbine power controller is arranged for receiving the damping reference signal and to derive the first reference signal and the second reference signal from the damping reference signal, said wind turbine power controller communicates the second reference signal to the damping controller.

According to one embodiment of the invention the power plant controller is arranged to calculate the first reference signal and the second reference signal, and dispatching the first reference signal and the second reference signal, to the wind turbine power controller and to the damping controller, of the at least one wind turbine generator respectively.

In a second aspect, the present invention relates to a method for damping electrical grid oscillations in a wind turbine generator with an electrical generator, a dump load unit, for dissipating power, a wind turbine power controller and a damping controller, wherein the method comprises, receiving a damping reference signal for damping the grid oscillations, determining a first reference signal of the damping reference signal and dispatching said first reference signal to the wind turbine power controller for controlling power generation of the electrical generator, determining a second reference signal with an oscillating part of the damping reference signal and dispatching said second reference signal to the damping controller for controlling the dump load unit.

The advantages of the second aspect and its embodiments are equivalent to the advantages for the first aspect of the present invention.

Any of the attendant features will be more readily appreciated as the same become better understood by reference to the following detailed description considered in connection with the accompanying drawings. The preferred features may be combined as appropriate, as would be apparent to a skilled person, and may be combined with any of the aspects of the invention.

DETAILED DESCRIPTION OF THE INVENTION

Figure 1:
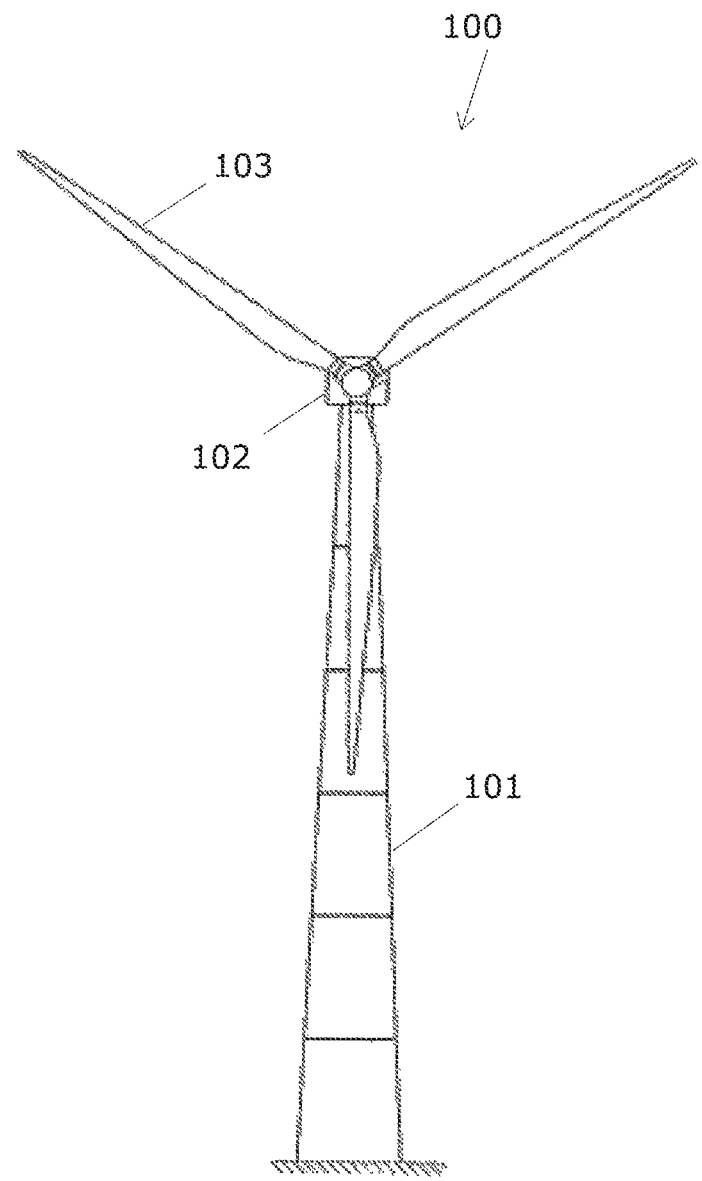
FIG. 1 shows a wind turbine generator.

The present invention will now be explained in further details. While the invention is susceptible to various modifications and alternative forms, specific embodiments have been disclosed by way of examples. It should be understood, however, that the invention is not intended to be limited to the particular forms disclosed. Rather, the invention is to cover all modifications, equivalents, and alternatives falling within the spirit and scope of the invention as defined by the appended claims.

For large Wind Power Plants (WPPs) a Power System Stabilizer (PSS) may be required. It is a well-known that a controller prevents one power plant from electro-mechanically oscillating against another or even one area of a continent from oscillating against another. Helping with these oscillations is something that Transmission System Operators look very favourably on.

Sub-synchronous resonances (SSR) are well-known for conventional power plants, but it is a relatively newly discovered phenomenon for wind power plants. This type of interaction phenomenon is generally referred to as a sub-synchronous control interaction (SSCI). This is a purely electrical phenomenon without shaft torsional dynamics being involved. Another characteristic of SSCI is that the resonance frequency varies depending on the network impedances. Other oscillating modes may include shaft torsional dynamics and can also be dealt with in the present invention.

The conventional sub-synchronous torsional interaction (SSTI) can occur in wind power plants. Wind turbines generally include several sub-synchronous torsional modes. It would be likely to excite one of these low-frequency torsional modes if the frequency of grid current coincides with one of them.

When created, these Sub-synchronous resonances (SSR) oscillations may cause damage to turbine-generator shafts and components attached to the shaft. The causes and consequences of sub-synchronous resonance are exacerbated by the continued growth of power transmission system interconnections.

To damp oscillations in the power system by using a wind power plant, some challenges are present, such as the possibility of mechanical resonances in the Wind Turbine Generators (WTGs). This could be tower oscillations or oscillations in the blade, but oscillations in the drive train, i.e. between the two mass systems, the rotor of the generator 303 and the aero dynamical rotor 103.

The present invention proposes a solution to avoid this risk of mechanical resonances.

It is known that frequency and voltage of the electric power transmitted in the grid may start oscillating due to disturbances or bad control coordination between different generation units. It is also known that such oscillations in the grid may be counteracted or damped by injecting electric power with the right phase relative to the grid oscillations. However, injection of such electric power may excite mechanical resonances in the power generator device which produces the damping electric power.

Wind power plants generally make extensive use of power electronic controllers such as turbine converters, and sometimes SVC and STATCOM for reactive power compensation and voltage control, and HVDC links for connection of offshore wind farms. These components can be located in the vicinity of rotating equipment such as those of the wind turbine and thermal power plants, or adjacent to variable frequency drive generators.

In a WPP a PSS would work by injecting a signal to the plant active power reference, Pref or reactive power reference Qref. This signal could be repetitive with frequency typically between 0.1 and 10 Hz. Instead of sending this oscillation demand directly to the generator of the wind turbine generator or the generator side of the variable frequency drive, the generator demand could be without the oscillating part, if a dump load unit is taken into account. For example, the overall WPP could produce a 1 Hz oscillation by having a dump load unit operate with a 1 Hz oscillation, but no WTG generators are excited at 1.0 Hz.

FIG. 1 shows a wind turbine generator 100 comprising a tower 101 and a nacelle 102. The rotor assembly of rotor blades 103 is rotatable by action of the wind. The wind induced rotational energy of the rotor blades 103 can be transferred via a shaft to a generator in the nacelle. Thus, the wind turbine generator 100 is capable of converting kinetic energy of the wind into mechanical energy by means of the rotor blades and, subsequently, into electric power by means of the generator.

The wind turbine generator can be connected to the grid for supplying the generated electric power to the grid.

It is known that frequency, voltage and current of the electric power transmitted in the grid may start oscillating due to disturbances. It is also known that such oscillations in the grid may be counteracted or damped by injecting a power signal into the grid with the right phase for counteracting the oscillations. In principle the damping power signal may be in anti-phase with the oscillations, although normally the damping signal is phase shifted relative to the principal anti-phase damping signal in order to generate the optimum damping.

Figure 3:
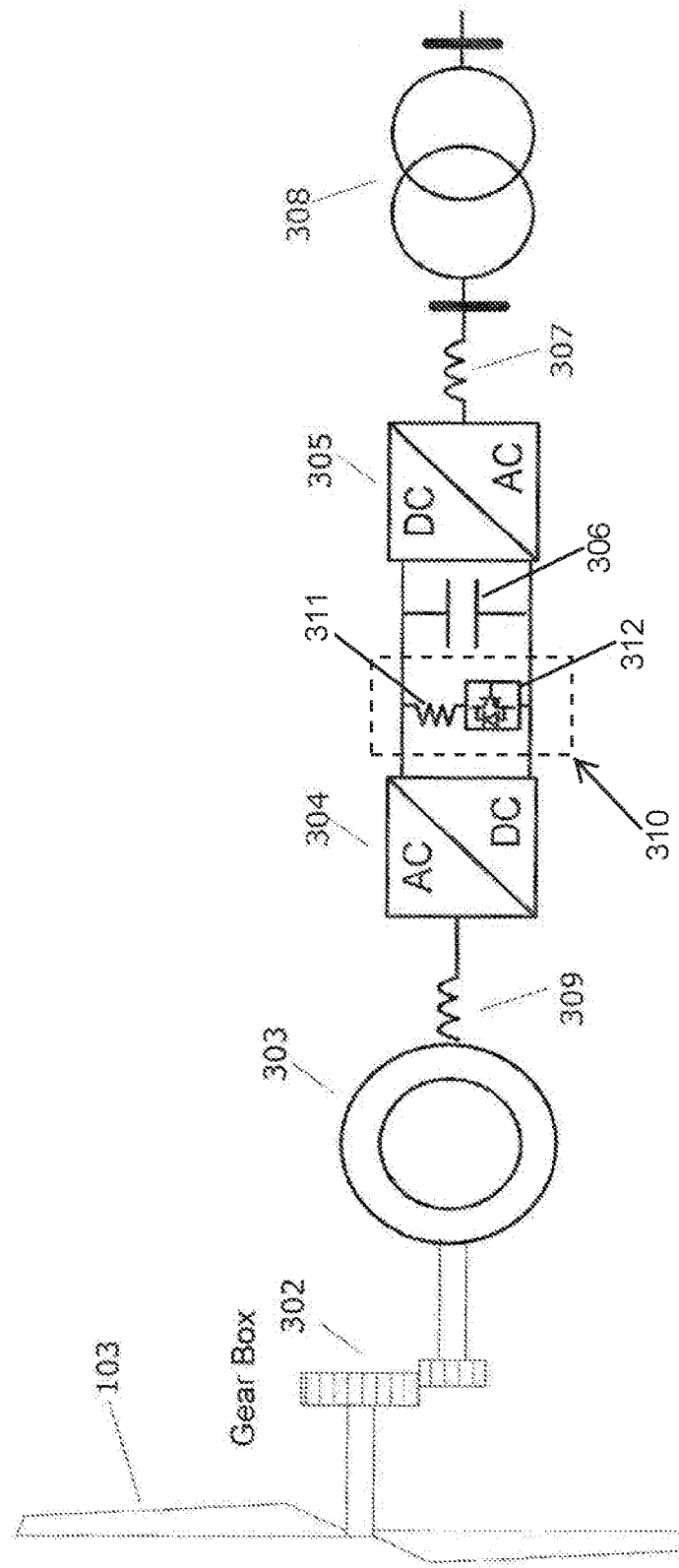
FIG. 3 illustrates the schematics of the drive train of a wind turbine generator, from the blades to the electrical grid.
Figure 4:
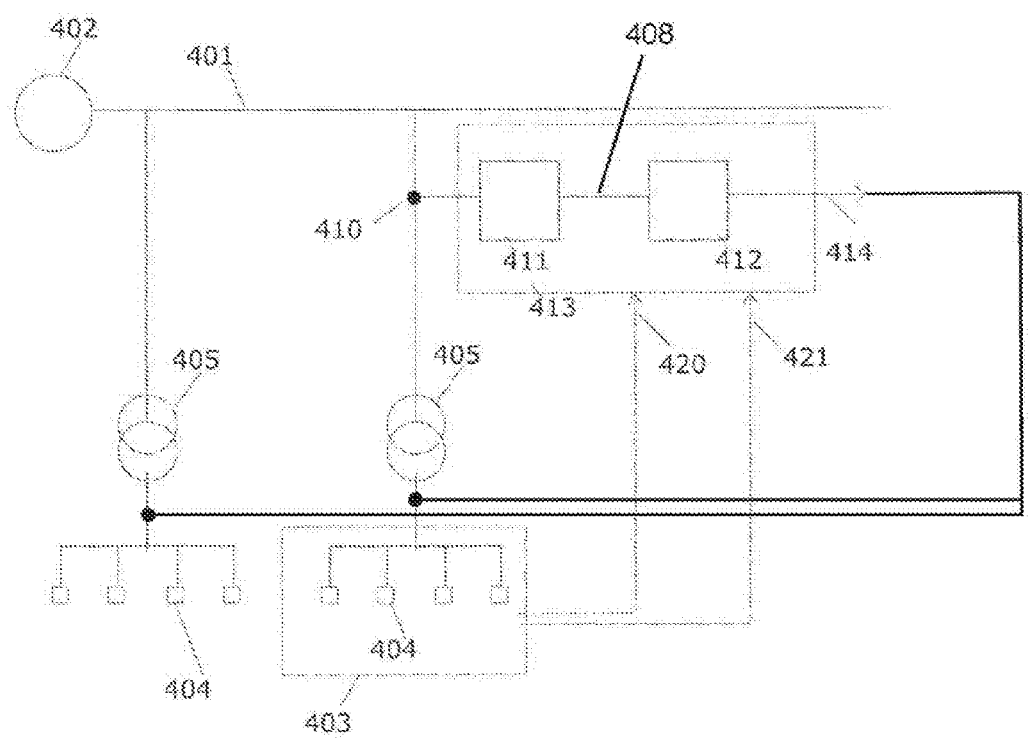
FIG. 4 illustrates a wind power plant comprising the main electrical grid, power generator units connected to the grid and a control system for damping grid oscillations.

The present invention is about a wind turbine generator 100 with an electrical generator 303, a dump load unit 310 (see FIG. 3) for dissipating power, a wind turbine power controller 413 (see FIG. 4) and a damping controller 411 (see FIG. 4) both arranged to control wind turbine components based on a damping reference signal 414 (see FIG. 4).

The damping reference signal 414 is a combined signal, and comprises a first reference signal 802 (see FIG. 8), 902 (see FIG. 9) and a second reference signal 803 (see FIG. 8), 903 (see FIG. 9), wherein the second reference signal 803, 903 is an oscillating part, the wind turbine power controller 413 (see FIG. 4) is controlling the power from the electrical generator 303 (see FIG. 3) according to the first reference signal 802, 902 and the damping controller is controlling the dump load unit to dissipate power according to the second reference signal 803, 903.

In one embodiment of the present invention the wind turbine power controller and the damping controller is located in one unit 413, with separate outputs, a power output (not shown) and a damping reference signal 414.

The main purpose of the dividing the damping reference into a first and second reference signal is that the dump load unit 310 can operate very fast and is by no means bandwidth limited to operate within the frequency range of 0.1 to 10 Hz. The dump load unit 310 may be restricted in the amount of energy that can be dissipated into the resistor 311, this can be handled in the dimensioning of the dump load resistor 311 and dump load switch 312, or alternatively by monitoring the state of the dump load resistor 311 and dump load switch 312, and thus only operate whenever the dump load resistor 311 is healthy.

In an embodiment of the invention the first reference signal is an envelope curve of the damping reference signal, so that the first reference signal provides an envelope around the damping reference curve 801, 901a, 901b needed to reduce the oscillation in the grid. While the second reference signal provides the oscillating part.

In another embodiment of the invention the first reference signal is a monotonic function. A monotonic function tends to move in only one direction as x increases. A monotonic increasing function always increases as x increases, i.e. f(a)>f(b) for all a>b. A monotonic decreasing function always decreases as x increases, i.e. f(a)<f(b) for all a>b. A monotonic decreasing function's derivative is always negative. A monotonic increasing function's derivative is always positive. Thus the mechanical stress on the wind turbine generator structure is reduced, as no oscillations happen in the generator 303.

Figure 2:
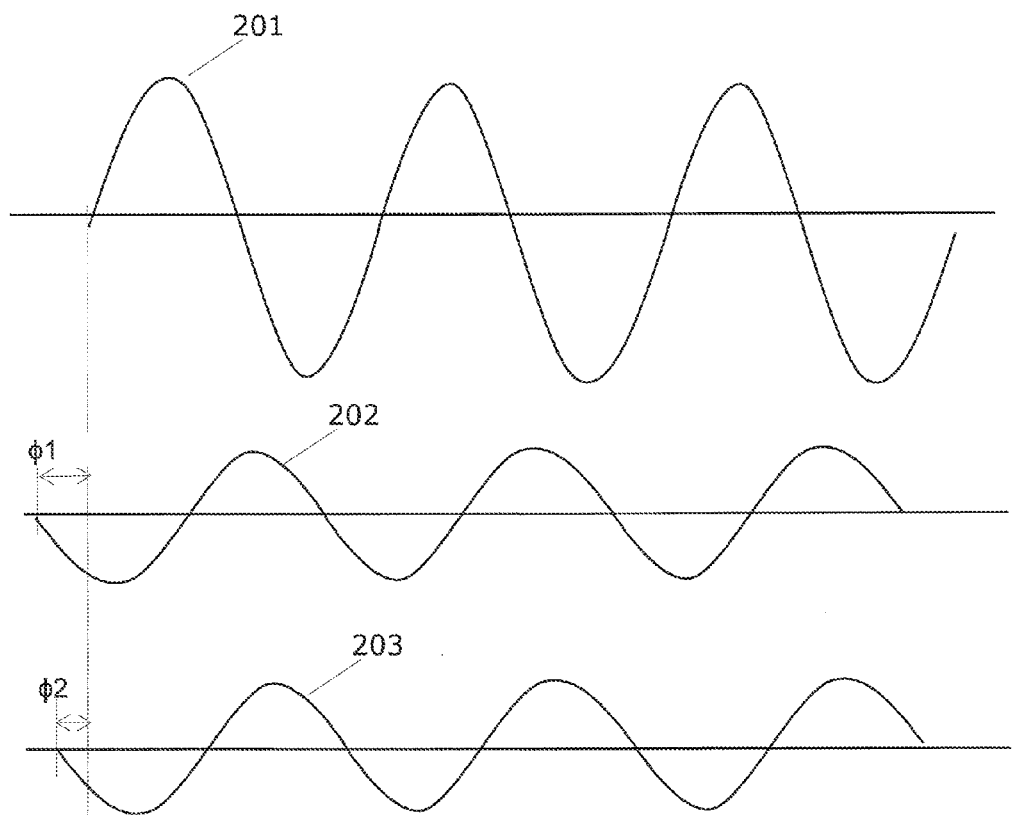
FIG. 2 illustrates an oscillation in the utility grid.

FIG. 2 illustrates an oscillation in the grid, e.g. in the form of an oscillating voltage amplitude 201 (i.e. the sinusoidal peak amplitude or RMS amplitude). From a measurement of the grid oscillation 201 a power reference 202 for damping the oscillation can be generated. By supplying the power reference 202 to a wind turbine generator 100, or a plurality of wind turbines generators 100, electric power is generated with the right phase with the grid oscillation and injected into the grid. As examples, oscillations in grid voltage or grid frequency can be damped by injecting electric power to the grid in anti-phase or with the undesired grid oscillations or having a particular phase relative to the undesired grid oscillations.

An explanation of why grid oscillations can be damped by injecting power to the grid is given here. If grid oscillations are present such as oscillations in grid frequency, then the speed of a main generator 402, 708 (e.g. the generator of a nuclear power station, not shown in the figures) is oscillating. By accelerating and breaking the generator at the right moments the grid oscillations can be damped. The breakings and accelerations of the main generator 402, 708 are done by changing the electrical torque experienced by the generator by injecting a damping power oscillation to the grid.

The power damping reference 202 may be determined on basis of a model of the power generator unit and the grid so that the power reference optimizes the damping of the grid oscillations. For example, the power damping reference 202 may be determined by determining a reference signal which when applied to the model optimizes the damping of the grid oscillations where the grid oscillations may be derived from the measured or estimated electrical parameters. The power damping reference 414 can be determined by using the feedback of one or more signals 410 from the grid, and processing them by a filter which will extract the oscillatory part of the grid feedback signals. Then the phase and magnitude of the damping reference signal 414 is corrected according to the feedback signals 410 and the control structure.

When an oscillating power reference 202 is used for controlling the power production of a wind turbine generator, the reference signal may cause the blade pitch to adjust in order to adapt the power production to the power reference 202. The adjustments of the pitch may inadvertently excite structural vibrations of different wind turbine components, e.g. vibrations of the blades 103, the shaft or the tower 101. Such excitation of vibrations is undesired since the vibrations may reduce the lifetime or damage components.

Other reference signals that the main power damping reference 202 may be used for controlling are the amount of active and/or reactive power injected to the grid. For example, a current reference may be defined which when applied to the controller of a wind turbine generator affects the amount of power injected into the grid. Since different types of damping references 202 may be used for controlling the damping power injected to the grid, reference is generally made to a main damping reference 202 which could be main power damping reference 202, a current reference or equivalent reference signals.

Other power generator units than wind turbine generators may be power controlled for damping grid oscillations 201. Such power generator units may also have structures which inadvertently can be mechanically excited, such as the turbine shaft of thermal solar power plants or other de-central gas turbine plants. Therefore, such other power generator units may cause the same challenges as wind turbine generators with respect to minimizing excitation of structural vibrations. Since, wind turbine generators and other power generator units with turbine driven generators give the same challenges with respect to inadvertently excited mechanical resonances only wind turbine generators 100 or wind turbine plants are used as examples for general power generator units.

FIG. 3 illustrates schematics of wind turbine generator according to an embodiment of the present invention. The embodiment shows a wind turbine generator with full conversion of the electrical power through a power converter 304, 305. Starting from left to right, the aero dynamical rotor 103 is mechanically connected to an optional gear box 302, if no gear box is present the aero dynamical rotor 103 is mechanically connected directly to an electrical generator 303. In the present embodiment the gear box 302 is mechanically connected to an electrical generator 303, which is electrically connected to a generator side power converter 304 via an induction link 309. The generator side power converter 304 converts variable AC electrical power to DC electrical power, and is connected to a grid side power converter 305 via a DC capacitor link 306. Parallel with the DC capacitor link 306 is a DC dump load unit 310. The dump load unit 310 comprises a dump load switch 312 that can dissipate electrical power by short circuit the DC link voltage through a resistor 311, the actual short circuit occurs by using an electrical switch, e.g. a semiconductor type such as IGBT, thyristors etc. or a mechanical switch.

The grid side power converter 305 converts the DC electrical power in "fixed" frequency electrical AC power, ("fixed" because the converter 305 follows the frequency of the grid, so if the frequency of the grid varies a little so will the frequency of the grid side power converter). The grid side power converter is electrically connected to a transformer 308 via a grid impedance 307. The transformer 308 is yet again connected to the electrical grid see more in FIG. 7.

In one embodiment the dump load can store the energy, instead of dissipating the energy, and can thus provide energy during the sections of second reference signal that are positive. In this embodiment the dump load resistor 311 is replaced by an energy storage device, such a storage device can be, but not limited to, a super capacitor bank, a battery bank or other storage devices known to the person skilled in the art.

According to one embodiment of the invention the wind turbine power controller 413 is arranged for receiving the damping reference signal and to derive the first reference signal and the second reference signal from the damping reference signal, said wind turbine power controller communicates the second reference signal to the damping controller.

According to one embodiment of the invention the power plant controller is arranged to calculate the first reference signal and the second reference signal, and dispatching the first reference signal and the second reference signal, to the wind turbine power controller and to the damping controller, of the at least one wind turbine generator respectively.

FIG. 4 shows a generator 402—e.g. a generator of a nuclear power station—which supplies electric energy to a main grid 401. Power generator units 404, e.g. in the form of wind turbine generators, also supplies electric power to the grid via transformer stations 405. A plurality of power generator units 404 may be grouped in a power generator plant 403.

A power generator unit 404 may be a single wind turbine generator 404, a wind power plant 403, other individual power generator such as a thermal solar power generator, or a generator plant comprising a plurality of power generators.

A damping controller 411 is connected to the point of common connection 409, i.e. a point located at the grid side of the transformer stations 405, for determining a main power damping reference 202 from measured or estimated electrical parameters relating to the utility grid. I.e. from measured or estimated values of grid voltage, active or reactive grid current, active or reactive grid power, grid frequency or generator speed of the generator 402.

The determined main power damping reference 408 is supplied to a damping dispatcher 412 which determines individual damping references for each of the individual wind turbine generators in the wind power plant 403 and communicates the individual damping reference signals 414.

FIG. 4 illustrates one embodiment of a wind turbine power controller 413 of an embodiment of the invention where the wind turbine power controller 413 comprises both the damping controller 411 and a damping dispatcher 412. According, to this embodiment, the wind turbine power controller 413 comprises an input for receiving measured or estimated electrical parameters relating to the utility grid, and an output for transmitting the determined reference signals 202, 203 to power generator units 404 or a distributor for distributing the damping reference signals 202, 203.

According to an embodiment, the wind turbine power controller 413 may further comprise an input 420 for receiving vibration values indicative of a structural vibration state of each of a plurality of power generator units, and to apply or assign the reference signals to the power generator units in dependence of the structural vibration states of each power generator unit. A structural vibration state may comprise vibration amplitude of an element of a power generator unit. The vibration state of a power generator unit may be measured or estimated by a sensor system of the power generator unit and transmitted to the wind turbine power controller 413.

According to another embodiment the wind turbine power controller 413 may further comprise another input 421 which provides information about the dump load unit back to the wind turbine power controller 413, the information can be, but is not limited to, temperature and operating time of the various components in the dump load unit, operating time.

According to another embodiment the individual damping reference signals 414 are determined without use of measured or estimated electrical parameters relating to the utility grid, e.g. measured grid power values, but from a main power damping reference 408. In this embodiment of the invention the wind turbine power controller 413 comprises a processor for determining the reference signals 414 from the main power damping reference 408 (i.e. the processor is equivalent to the damping dispatcher 412), an input for receiving the main power damping reference 408 and an output for the determined damping reference signals 414.

According to yet another embodiment the individual damping reference signals 414 may be determined directly from the electrical parameters of the grid without initial determination of the main power damping reference 202. In this embodiment of the invention the wind turbine power controller 413 comprises a processor for determining the damping reference signals 414 directly from the electrical parameters of the grid as described above, an input for receiving the electrical parameters and an output for the determined damping reference signals 414.

Figure 6A:
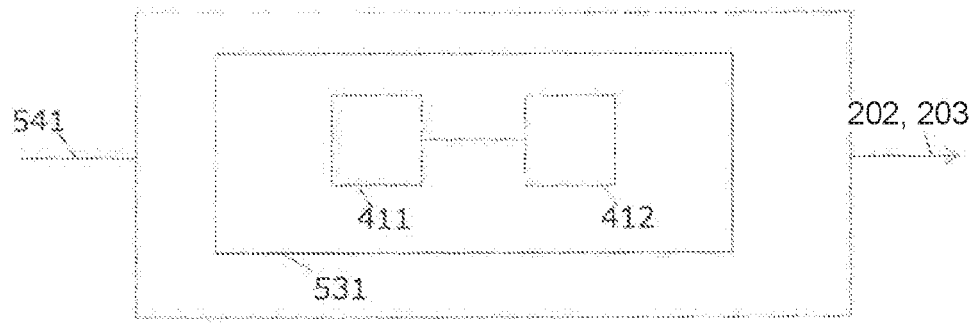
FIG. 6 shows schematic embodiments of the present invention.
Figure 6B:
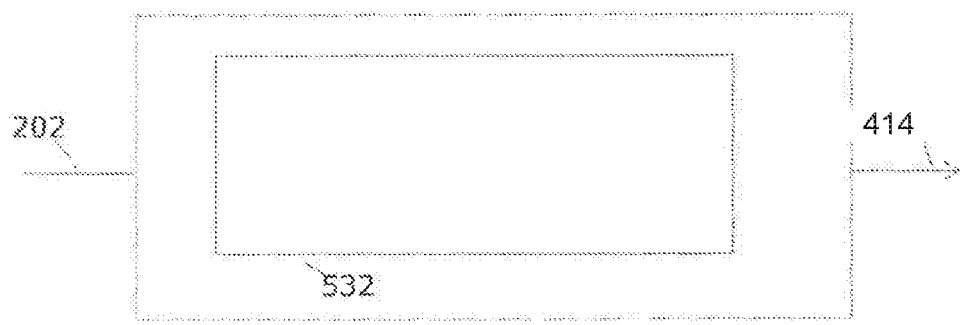
Figure 6C:
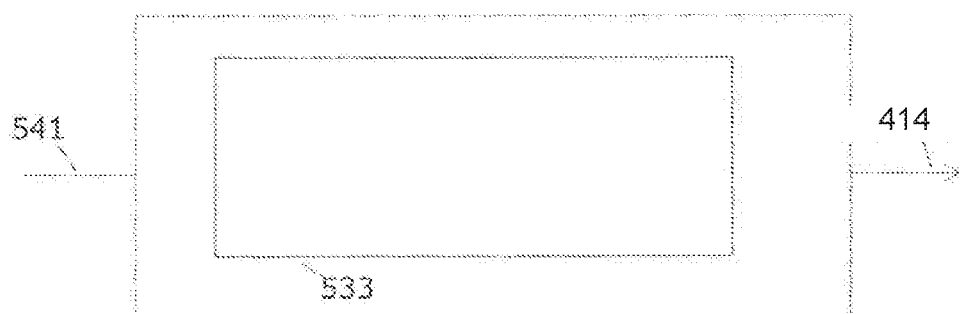

FIG. 6A-C illustrates three embodiments of the processor 531-533 of the wind turbine power controller 413. In FIG. 6A the processor 531 is equivalent to the damping controller 411 and the damping dispatcher 412 so that the individual damping reference signals 202, 203 are determined from the electrical parameters 541.

In FIG. 6B the processor 532 determines the individual reference signals 414 directly from a main power damping reference 202. In FIG. 6C the processor 533 determines the individual reference signals 414 directly from the electrical parameters 541.

The processor, e.g. the damping dispatcher 412, may further be configured to distribute the individual power damping reference signals 414 among the power generator units 404. Alternatively or additionally, the capability of distributing the individual reference signals 414 may be located in a separate dispatcher unit, e.g. at the location of a wind turbine plant. It is understood that the individual reference signals 414 may be applied to generator units 404 located in a single location, such as a single plant 403, or in different locations.

Accordingly, the function of the processor depends on how the individual control references are determined. Accordingly, the processor is understood as a processor or control system capable of determining the individual damping reference signals 414 according to anyone of the three embodiments explained above, i.e. the processor may also be understood as being configured to carry out the function of the damping controller 411 and the damping dispatcher 412.

In other embodiments the damping controller 411 is located in each of the wind turbine generators 404, 100 wherein the need for a dispatcher is eliminated.

Figure 5:
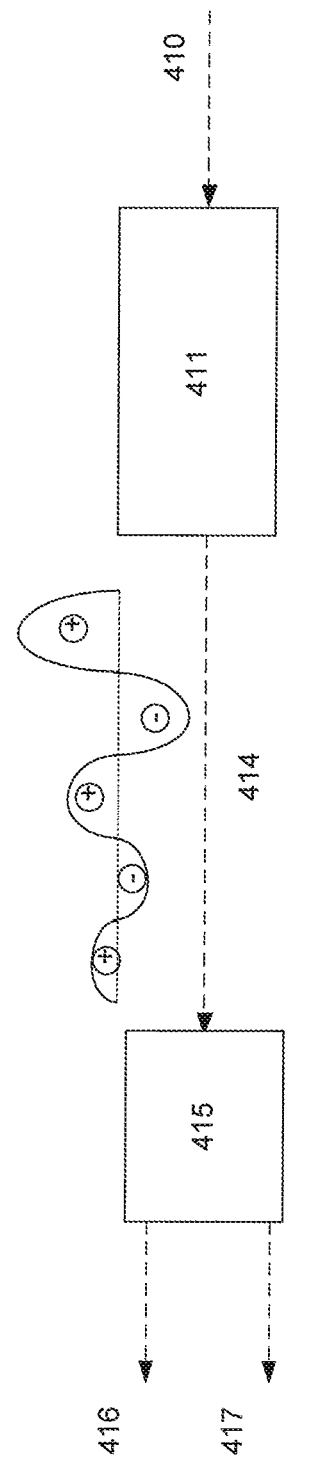
FIG. 5 illustrates how a damping is split into first and second damping reference.

FIG. 5 shows the schematics of how the damping signals are handled in an embodiment. The input signal 410 is communicated to the damping controller 411 and the damping controller 411 communicates a damping reference signal 414.

In some embodiments of the invention the damping controller 411 is located centrally in a power plant controller where it through the damping dispatcher 412 dispatches the individual damping reference signals 414.

In FIG. 5 there is no dispatcher and the reference signal 414 is handled in a damping signal splitter 415 that computes the first reference signal 416 and the second reference signal 417.

The damping controller 411 calculates the active power reference, also called the damping reference 801, 901a, 901b, to be injected into the electrical grid in order to provide some damping support, the injection might not eliminate the oscillation. The damping reference 801, 901a, 901b, is split into two signals a first reference signal and a second reference signal 803, 903. The first reference signal 802, 902 is considered to be an envelope curve around the actual damping reference.

In another embodiment there is a Dispatcher 412. In some embodiments the dispatcher and the damping signal splitter 415 is one unit and communicates to all WTGs 404 in the wind power plant. Here the dispatcher 412 dispatches a vector damping reference signal 414 wherein the vector comprising a first 416 and second reference signal 417 is contained.

In an embodiment several wind power plants work in a coordinated way for damping an oscillation, depending on the location the amplitude and the phase of the damping reference signal may differ.

Figure 7:
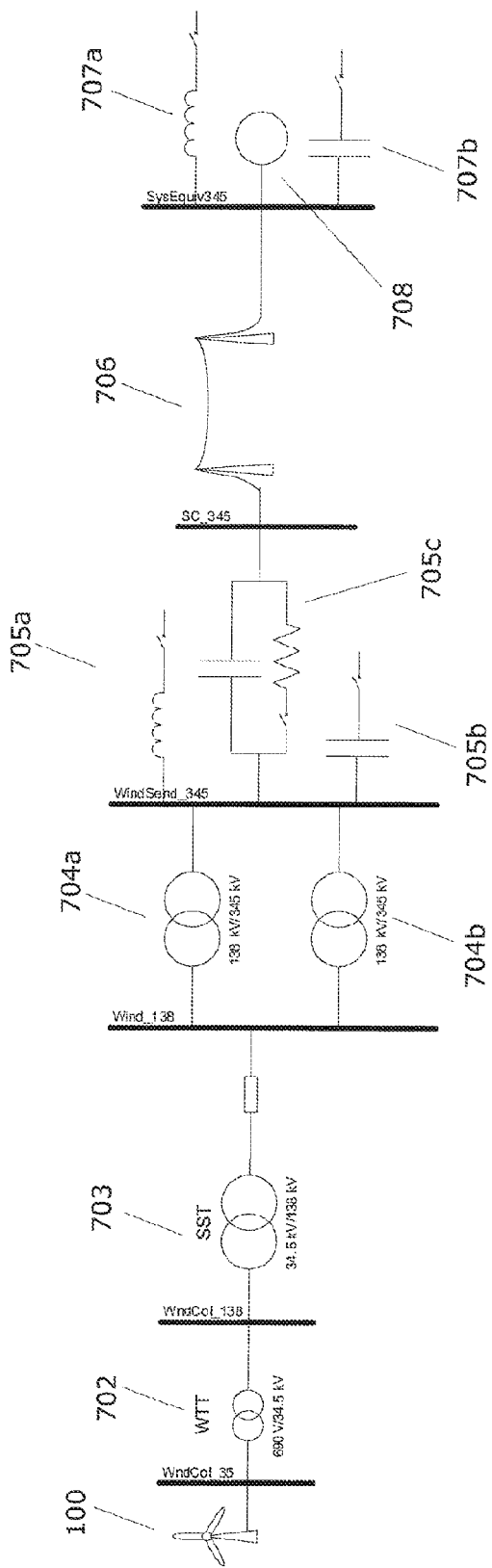
FIG. 7 shows an electrical lay out of an electrical grid with wind power plant and another power plant.

FIG. 7 shows an example of an electrical grid setup wherein a wind power turbine 100 is connected to an AC system operating at 345 kV. In reality the single wind turbine generator 100 is a plurality of turbines.

FIG. 7 shows a schematic diagram of an electrical power system under consideration. A wind turbine generator 100 is connected to a wind turbine transformer 702, in some embodiments the transformer 308 of FIG. 3 may be the same transformer as transformer 702 also called WTT 702. The WTT 702 is connected to a substation transformer (SST) 703 that again is connected to a high voltage transformer 704a and 704b, for large wind power plants a dual source for the high voltage transformer 704ab is often used. The electrical grid is also equipped with filter components such as inductors 705a, capacitors 705b and tuned filers 705c, it is all connected to a transmission line 706. At the other end of the transmission line 706 is another power generating source 708 attached together with filter components 707a and 707b.

Figure 8:
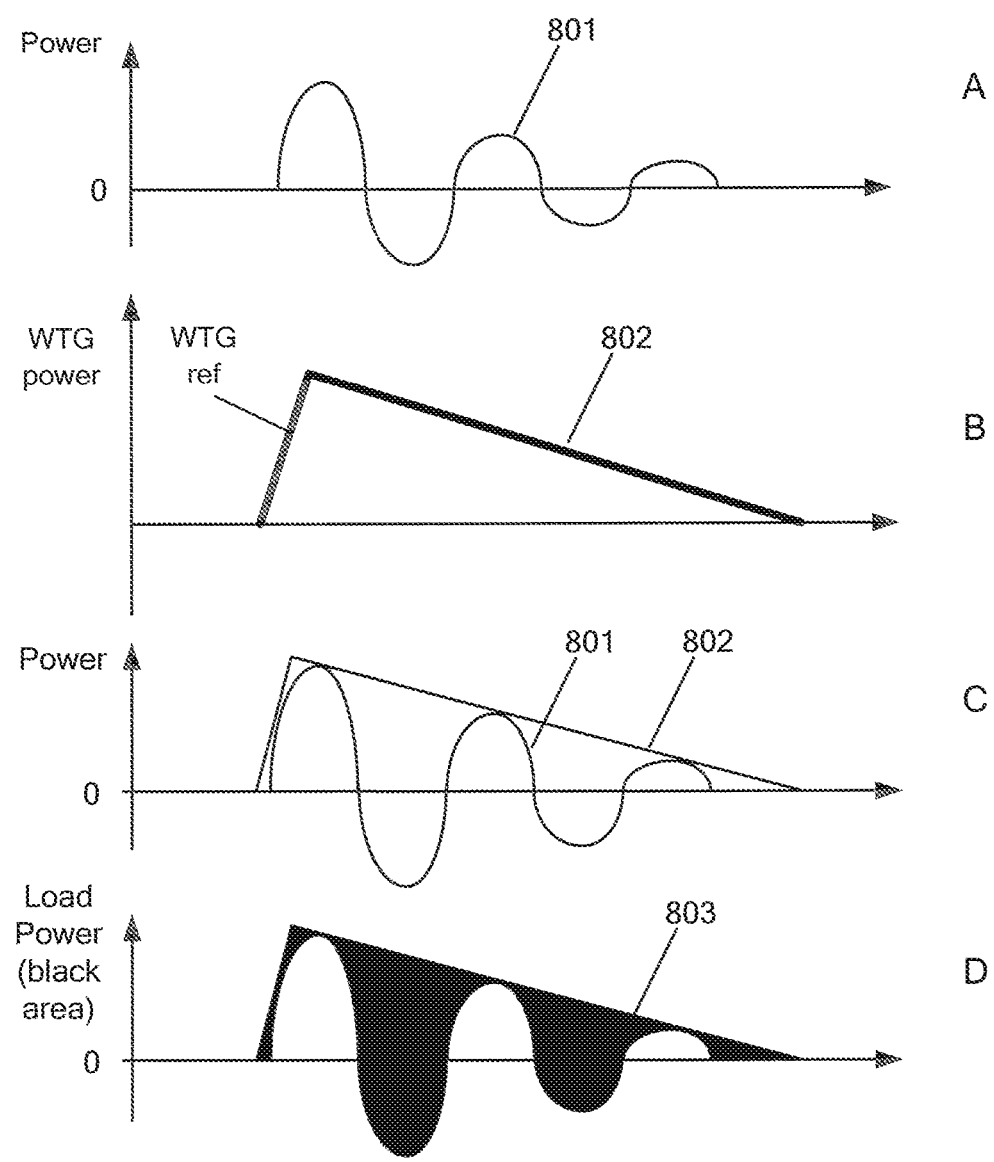
FIG. 8 show a damping reference signal and the first and second reference signal according to the damping reference, in an overload situation.

FIG. 8 is divided into four parts A, B, C and D. The figure shows an example of how the reference signals can look like in a situation where turbine is operating in an overrating mode to handle the oscillation. FIG. 8A shows an example of a damping reference signal 801, an embodiment of the invention where the first reference signal is decreasing after a short increase, the increasing part is not a real ramp but more an effect from using a discrete controller that dispatches reference signals with fixed intervals, so a first sample is at zero and a second sample is at the peak. After the increase the reference signal 802 is then going from a positive value, and wherein the wind turbine power controller is receiving a positive power reference, down to zero. Where FIG. 8B shows the first reference signal 802, the first reference shows an increase in the power production that declines to normal level. In reality the signal 802 is added together with the actual power reference to the WTG, which is known to person skilled in the art. FIG. 8C shows how the first reference signal 802 fits together with the damping reference signal 801. The second reference signal is in FIG. 8D derived by the area between the two signals 801, 802, giving the second reference signal 803.

Figure 9:
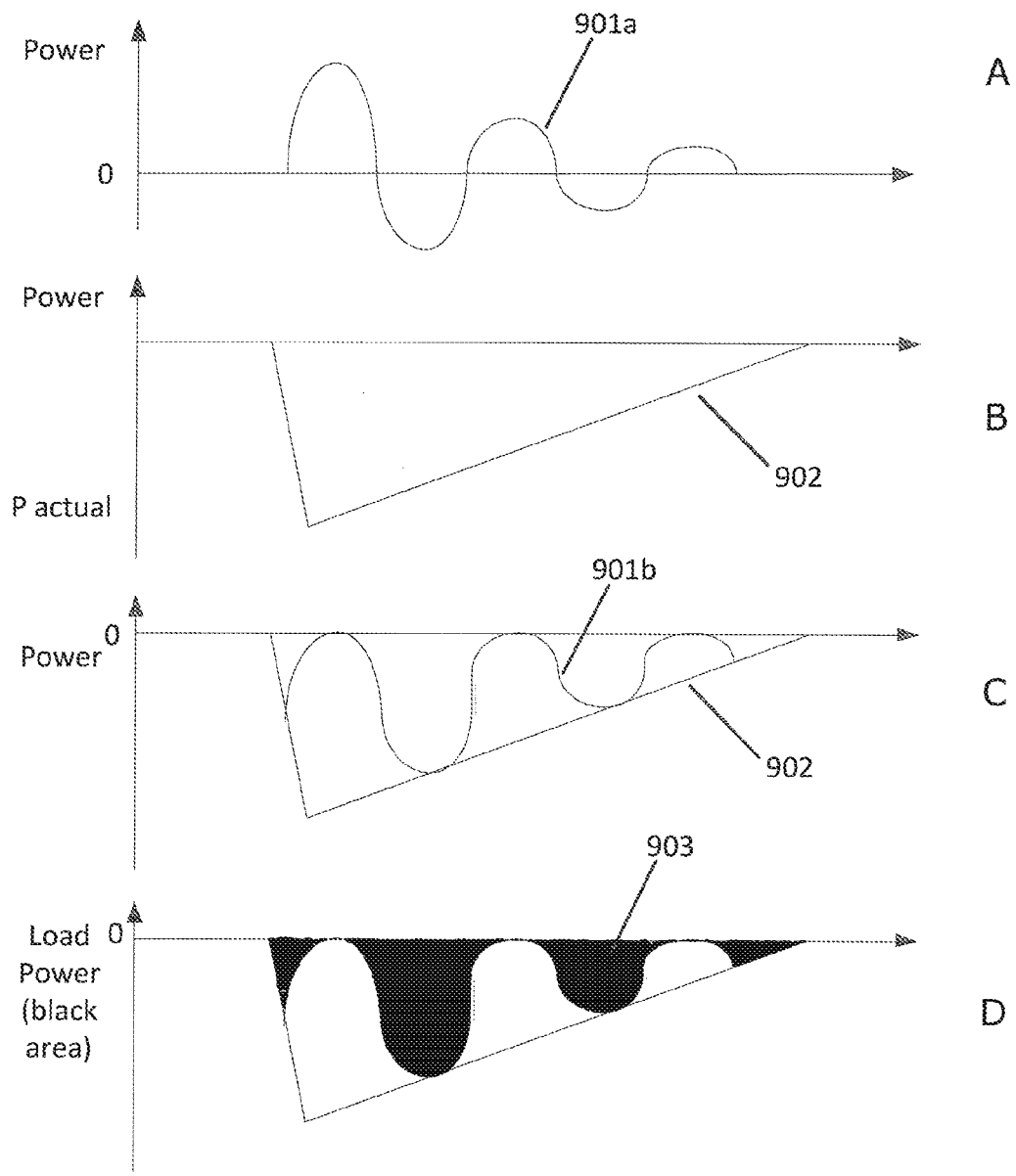
FIG. 9 show a damping reference signal and the first and second reference signal according to the damping reference, in a derating situation.

FIG. 9 is divided into four parts A, B, C and D. The figure shows an example of how the reference signals can look like in a situation where turbine is operating in a derating mode to handle the oscillation. FIG. 9A shows an example of a damping reference signal 901a, an embodiment of the invention where the first reference signal is increasing after an short decrease, also due to a discrete controller and a sampled system, and then going from a negative value, and wherein the wind turbine power controller is also receiving a positive power reference. Where FIG. 9B shows the first reference signal 902, the first reference shows an decrease in the power production, in reality the signal 902 is added together with the actual power reference to the WTG, which is known to person skilled in the art. FIG. 9C shows how the first reference signal 902 fits together with the damping reference signal 901b, where the damping reference signal 901b is adjusted with first order function equal or similar to the trend function of damping reference signal 901a. The second reference signal is in FIG. 9D derived by the area between the two signals 901b, 902, giving the second reference signal 903.

In an embodiment related to the situation in FIG. 8, the envelope curve 802 can have a shape that actually allow the whole damping reference signal to be enveloped, i.e. so there will be no negative parts of the second reference signal, to compare it to FIG. 8D, will all the darkened area be above the zero line.

Figure 10:
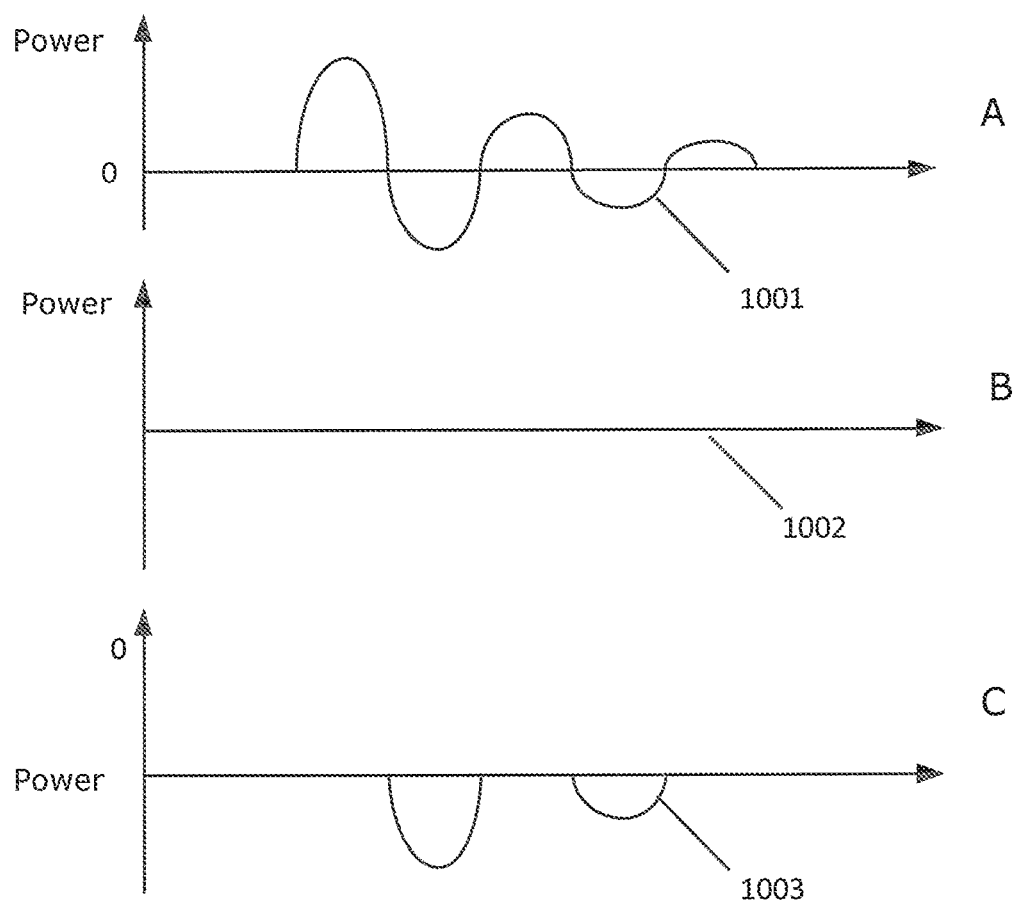
FIG. 10 show a damping reference signal and the first and second reference signal according to the damping reference, in a no load situation.

FIG. 10 is divided into three parts A, B and C. The figure shows an example of how the reference signals can look like in a situation where turbine is operating no power mode to handle the oscillation. FIG. 10A shows an example of a damping reference signal 1001, an embodiment of the invention where the first reference signal is zero, and wherein the wind turbine power controller is receiving a power reference that could be zero. FIG. 10B shows the first reference signal 1002. FIG. 10C shows how the second references signal 1003 which is the negative part of the damping reference signal 1001.

According to one embodiment of the invention the first reference signal is substantially zero and wherein the dump load unit dissipates the negative sections of the second reference signal. Even if the first reference signal is substantially zero the dump load can still provide some contribution to the reduction of the oscillation.

In another embodiment the dump load can store the energy in storing devices such as batteries, capacitors or others, the shape of the first reference signal is changed, as an envelope curve 802, 902 no longer needs to cover both the positive and negative part of the oscillations, as the dump load unit 310 either absorb power or inject power depending on the sign damping signal 801, 901a, 901b.

In an embodiment of the present invention the generator 303 of the WTG is producing the positive part of the damping reference signal, whereas the negative part is absorbed by the dump load unit.

Figure 11:
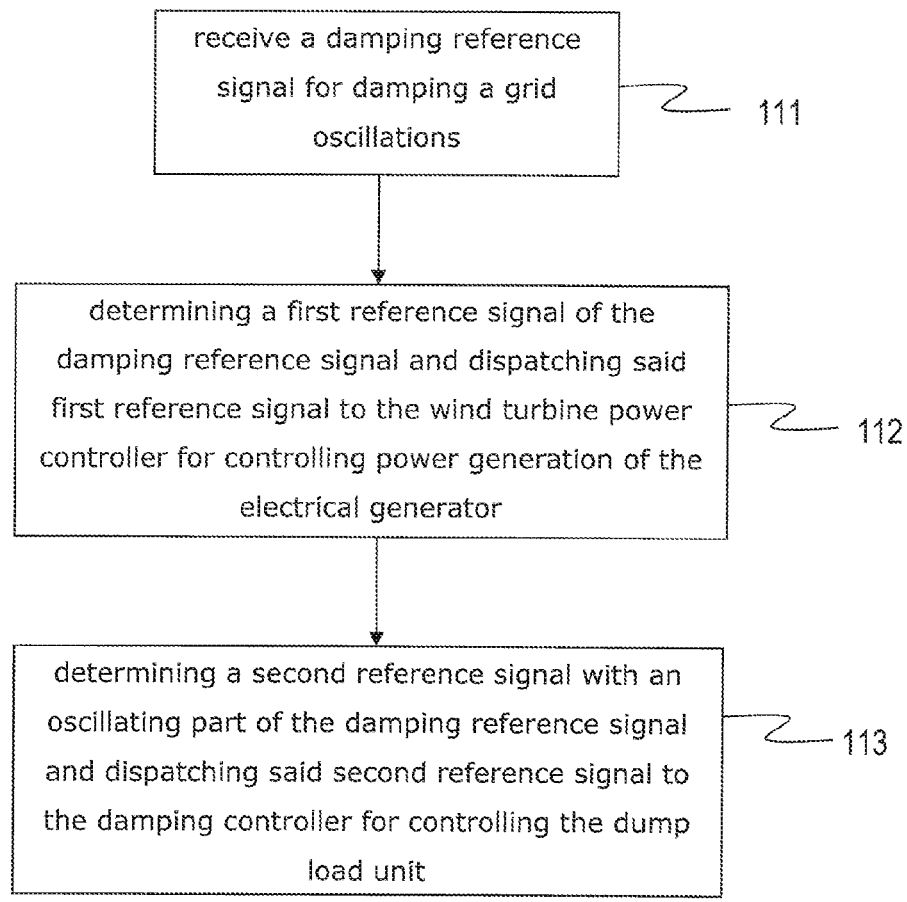
FIG. 11 shows a flow chart of the method according to the invention.

FIG. 11 shows a flow chart of a method according to the present invention, for damping electrical grid oscillations in a wind turbine generator with an electrical generator, a dump load unit, for dissipating power, a wind turbine power controller and a damping controller, the method comprises step 111, 112 and 113. Where step 111 is receiving a damping reference signal for damping the grid oscillations, and step 112 is determining a first reference signal of the damping reference signal and dispatching said first reference signal to the wind turbine power controller for controlling power generation of the electrical generator and step 113 is determining a second reference signal with an oscillating part of the damping reference signal and dispatching said second reference signal to the damping controller for controlling the dump load unit.

Any range or device value given herein may be extended or altered without losing the effect sought, as will be apparent to the skilled person.

It will be understood that the benefits and advantages described above may relate to one embodiment or may relate to several embodiments. It will further be understood that reference to 'an' item refer to one or more of those items.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

What is claimed is:

1. A wind turbine generator comprising:
   an electrical generator;
   a dump load unit configured to dissipate at least a portion of power generated by the electrical generator; and
   a wind turbine power controller configured to:
      receive a damping reference signal,
      derive a first reference signal and a second reference signal from the damping reference signal,
      control, based on the first reference signal, power generated by the electrical generator, and
      communicate the second reference signal to a damping controller configured to operate the dump load unit based on the second reference signal.

2. A wind turbine generator according to claim 1, wherein the first reference signal is an envelope curve of the damping reference signal.

3. A wind turbine generator according to claim 2, wherein the first reference signal is decreasing and starting from a positive value, and wherein the wind turbine power controller is further configured to control the electrical generator based on a positive power reference.

4. A wind turbine generator according to claim 1, wherein the first reference signal is a monotonic function.

5. A wind turbine generator according to claim 2, wherein the first reference signal is increasing and starting from a negative value.

6. A wind turbine generator according to claim 5, wherein the first reference signal is negative, and the wind turbine power controller sends a reference signal equaling zero to the electrical generator.

7. A wind turbine generator according to claim 1, wherein the first reference signal is substantially zero and wherein the dump load unit dissipates a negative section of the second reference signal.

8. A wind power plant comprising a power plant controller and at least one wind turbine generator according to claim 1, wherein the power plant controller is configured to:
   calculate the first reference signal and the second reference signal,
   communicate the first reference signal to the wind turbine power controller of the at least one wind turbine generator, and
   communicate the second reference signal to the damping controller of the at least one wind turbine generator.

9. A wind turbine generator according to claim 1, wherein the dump load unit comprises a storage device for storing energy.

10. A wind turbine generator according to claim 1, wherein the first reference signal is a non-oscillating signal and the second reference signal is an oscillating signal.

11. A method for damping electrical grid oscillations using a wind turbine generator comprising an electrical generator, a dump load unit configured to dissipate at least a portion of power generated by the electrical generator, a wind turbine power controller, and a damping controller, wherein the method comprises:
   receiving a damping reference signal;
   determining, based on the damping reference signal, a first reference signal and communicating the first reference signal to the wind turbine power controller for controlling power generation of the electrical generator; and determining, based on the damping reference signal, a second reference signal and communicating the second reference signal to the damping controller for controlling the dump load unit.

12. A method according to claim 11, wherein the first reference signal is an envelope curve of the damping reference signal.

13. A method according to claim 12, wherein the first reference signal is increasing and starting from a negative value.

14. A method according to claim 12, wherein the first reference signal is decreasing and starting from a positive value, and wherein the wind turbine power controller further configured to control the electrical generator based on a positive power reference.

15. A method according to claim 11, wherein the first reference signal is a monotonic function.

16. A method according to claim 11, wherein the first reference signal is substantially zero and wherein the damping controller is controlling the dump load unit to dissipates the negative sections of the second reference signal.

17. A method according to claim 11, wherein the dump load unit comprises a storage device for storing energy.

18. A method according to claim 11, wherein the first reference signal is a non-oscillating signal and the second reference signal is an oscillating signal.

19. A wind power plant comprising:
one or more wind turbine generators each comprising:
an electrical generator,
a wind turbine power controller configured to control power generated by the electrical generator based on a first reference signal, and
a damping controller configured to operate a dump load unit based on a second reference signal; and
a power plant controller configured to:
determine a damping reference signal,
calculate the first reference signal based on the damping reference signal,
calculate the second reference signal based on the damping reference signal,
communicate the first reference signal to the wind turbine power controllers of the one or more wind turbine generators, and
communicate the second reference signal to the damping controllers of the one or more wind turbine generators.

* * * * *